United States Patent

Knox

[15] 3,668,474
[45] June 6, 1972

[54] APPARATUS FOR AUTOMATIC RELAY SYSTEM TESTING

[72] Inventor: Marion D. Knox, Oklahoma City, Okla.

[73] Assignee: Wayne Electronic Products Company, Oklahoma City, Okla.

[22] Filed: Oct. 19, 1970

[21] Appl. No.: 81,694

Related U.S. Application Data

[63] Continuation-in-part of Ser. No. 19,869, Mar. 16, 1970.

[52] U.S. Cl. ..........................317/28 R, 324/73, 340/146.1, 340/309.1, 340/319
[51] Int. Cl. ......................................G01r 15/12, G08b 1/08
[58] Field of Search ................340/146.1, 309.6, 309.1, 318, 340/319; 324/73; 317/28, 29

[56] References Cited
UNITED STATES PATENTS 3,414,773  12/1968  Knox .......................................317/28

*Primary Examiner*—J. D. Miller
*Assistant Examiner*—Harvey Fendelman
*Attorney*—Dunlap, Laney, Hessin & Dougherty

[57] ABSTRACT

Apparatus for periodic testing of multiple-terminal, remote trip, dual transfer trip relaying systems. The apparatus consists of periodically actuatable test units which provide a plurality of program outputs to effect transmission tests of transfer trip channels as well as proper operation of the associated relay equipment. A master test unit located at a first position initiates operation and functions with one or more slaved remote test units to key transmissions and verify reception at the transfer trip receiver equipment, while test signification is made in accordance with programmed requirement via an associated return communications link.

11 Claims, 7 Drawing Figures

INVENTOR
MARION D. KNOX

INVENTOR
MARION D. KNOX

BY
Dunlap, Laney, Hessin & Dougherty
ATTORNEYS

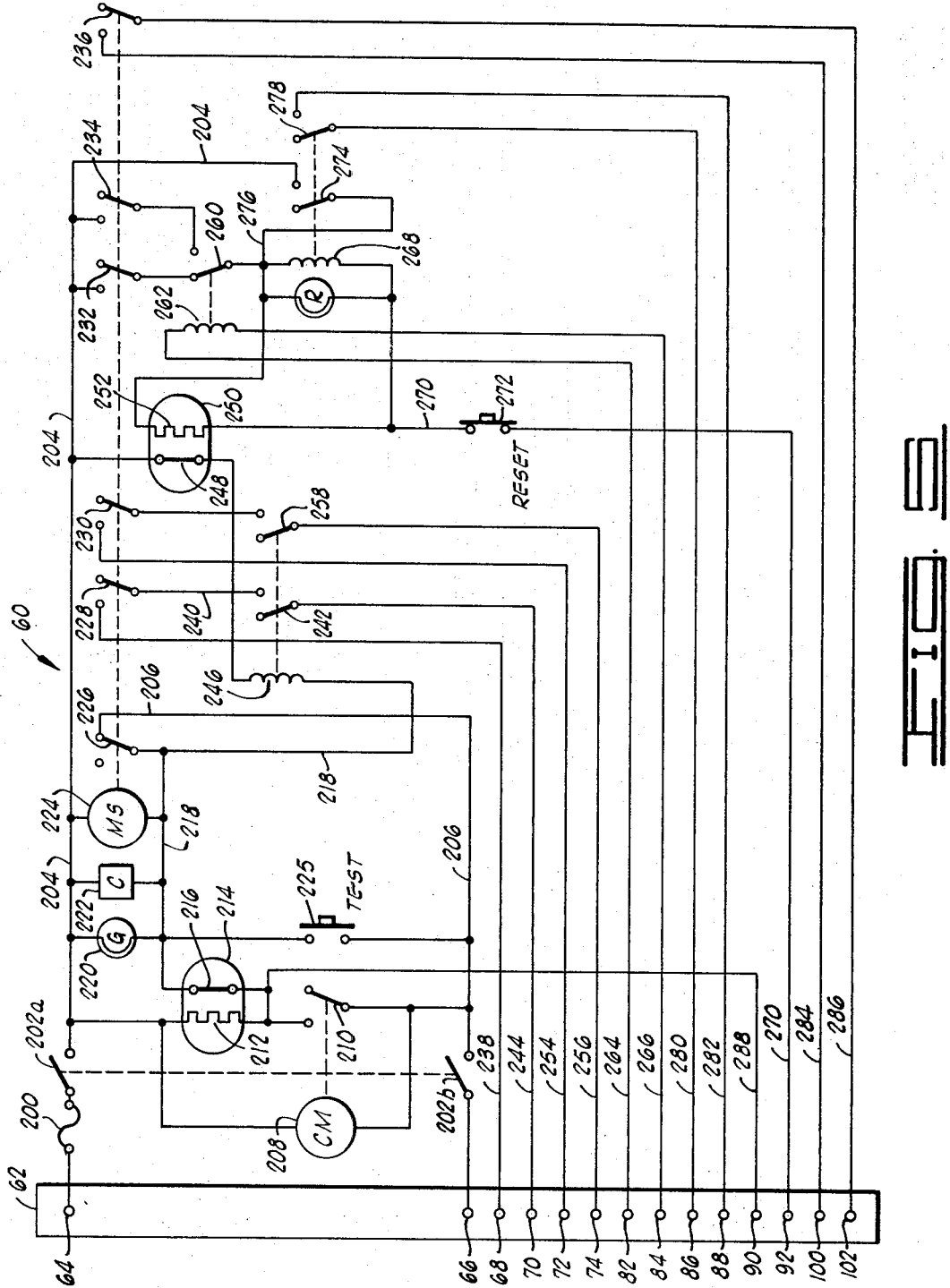

APPARATUS FOR AUTOMATIC RELAY SYSTEM TESTING

CROSS-REFERENCE TO CO-PENDING APPLICATION

The present application constitutes continuation-in-part subject matter relative to prior filed U.S. application Ser. No. 19,869, filed on Mar. 16, 1970 and entitled "Apparatus for Automatic Relay System Testing."

BACKGROUND OF THE INVENTION

1. Field of the Invention

The invention relates generally to apparatus for automatic testing of surveillance equipment for high voltage transmission lines and the like, and more particularly, but not by way of limitation, it relates to improved testing apparatus for carrying out automatic, programmed sequence testing of dual channel transfer trip equipment as utilized for surveillance indication along a communications link, voltage transmission line, etc.

2. Description of the Prior Art

Most prior art methods of communications or transmission circuit testing have been carried out by the attention of working operators, utilizing voice communication for synchronization purposes where necessary, to perform predetermined sequence switching in order to open TRIP circuitry thereby to prove verity of the associated surveillance circuitry. Thus, prior microwave transmitter-receiver links, power line carrier systems, audio tone equipment, and pilot wire equipment relied upon such attendant-instituted test procedures for validity check. Automatic testing methods of recent genesis are exemplified by the U.S. Pat. No. 3,414,773 issued Dec. 3, 1968 in the name of the present inventor and entitled "Automatic Carrier Circuitry for Testing Multiple Terminal Points Employing Timer Sampling Means." The teaching of this patent is directed to automatic testing apparatus utilizing periodically actuatable program sampling structure which then effects the necessary switching and circuit isolation to test the various transmission and reception modes of the carrier system and related relay controls.

SUMMARY OF THE INVENTION

The present invention contemplates apparatus for automatic testing of remote transfer trip line surveillance systems, and especially such systems as directed to plural, parallel transmitter and receiver combinations operating unidirectionally between two or more interconnected terminals. In a more limited aspect, the invention consists of automatic testing means for testing between adjacent terminals of a high voltage transmission line, usually with two or more transmitter-receiver linkages being connected between said terminals in one direction and with some form of return link used in association therewith to complete the testing communications loop.

Therefore, it is an object of the present invention to provide an automatic testing unit for periodic check of operatively associated terminal positions having transfer trip surveillance circuitry connected therebetween.

It is also an object of the invention to provide an automatic relay system tester for periodically testing multiple terminal, remote trip, dual transfer trip relaying systems including transmitters, receivers, and static relays.

It is yet another object of the invention to provide test apparatus for dual transfer trip interconnection circuitry which is automatically periodically actuatable to check requisite operational functions.

It is still further an object of the present invention to provide apparatus for effecting automatic testing of transmission circuitry automatically in accordance with a readily adjustable and expandable program sequence.

Finally, it is an object of the invention to test dual channel transfer trip protection relaying systems to verify proper operation of guard and trip conditions of the system interconnection.

Other objects and advantages of the invention will be evident from the following detailed description when read in conjunction with the accompanying drawings which illustrate the invention.

BRIEF DESCRIPTION OF THE DRAWING

FIG. 5 illustrates schematically a system test circuit as utilized at a master terminal;

DETAILED DESCRIPTION OF THE INVENTION

Figure 1:
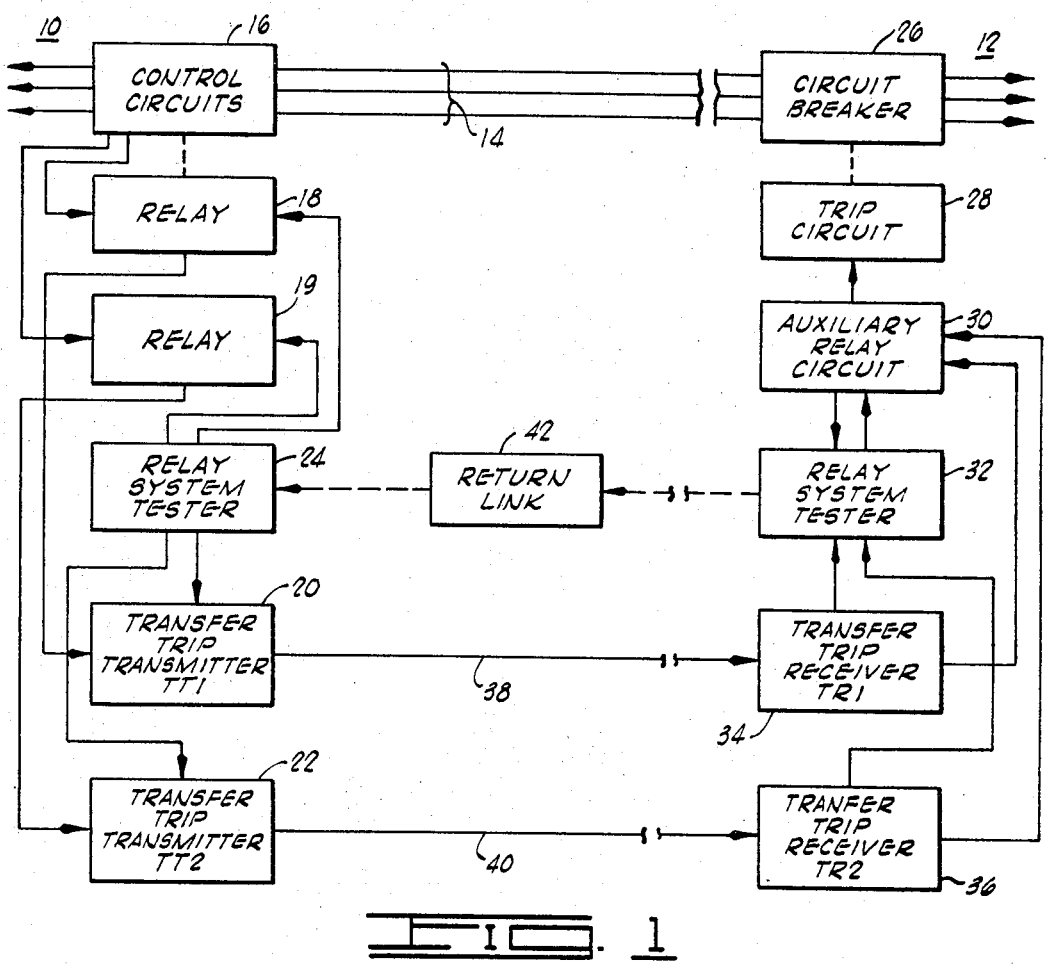
FIG. 1 is a block diagram of a typical dual channel transfer trip system as utilized between adjacent terminals of a high voltage transmission line, and including relay system testers constructed in accordance with the present invention.

The block diagram of FIG. 1 illustrates a system interconnection between terminals 10 and 12 disposed along such as a high voltage transmission line 14. Thus, terminal 10 which may be considered the master terminal includes control circuits 16, sensing transformers or the like, which are operatively connected to relays 18 and 19 within such as a conventional form of protective relay circuitry. A pair of transfer trip transmitters 20 and 22 as well as a master relay system tester 24 are interconnected to function with each of the protective relays 18 and 19 and respective transfer trip transmitters 20 and 22.

The remote terminal 12 may include such as a circuit breaker 26 in operative association with a trip circuit 28, an auxiliary relay circuit 30, and a remote position relay system tester 32. A pair of transfer trip receivers 34 and 36 are in communication with transfer trip transmitters 20 and 22 via communication links 38 and 40, respectively, and each of transfer trip receivers 34 and 36 is also interconnected with relay system tester 32. The return link of the testing communications loop is provided from relay system tester 32 via suitable return link 42, e.g. tone, carrier system, leased wire line, or other communication link, with return to master relay system tester 24. The communications links 38 and 40 between respective transmitters 20 and 22 and receivers 34 and 36 are conventional relaying media routes and are frequency differentiated.

Figure 2:
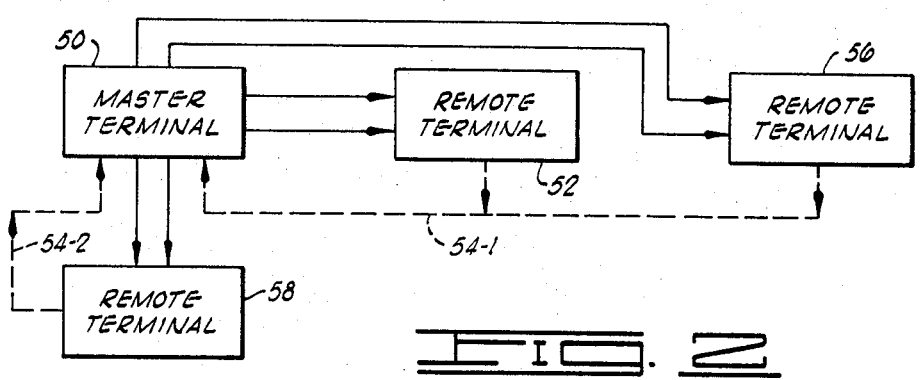
FIG. 2 illustrates in general block form the flexibility of the relay test system as to the number and sequence of terminal interconnections.

The testing system is not to be limited to merely testing between a master and one remote terminal. Thus, as shown in FIG. 2, testing may take place between a master terminal 50 and a number of remote positions located in any direction along the line. In each instance or configuration, the system program must be adjusted in accordance with the receiver location requirements. Master terminal 50 may be connected to effect transfer trip relay testing with a remote terminal 52, a return communications link being provided by dash-line 54-1. And, if the program is properly adjusted, system testing may also be effected with respect to another remote terminal 56, return link also being by communications route 54-1. The master terminal 50 may also be effective in another testing system with a remote terminal 58 having a return link or dash-line 54-2. There is virtually no restriction on the number and location of remote trip transfer trip receiver test procedures which can be instituted by the master terminal so long as adequate program instruction is provided on the same channels to the periodically actuated automatic programming structure of the invention.

Figure 3:
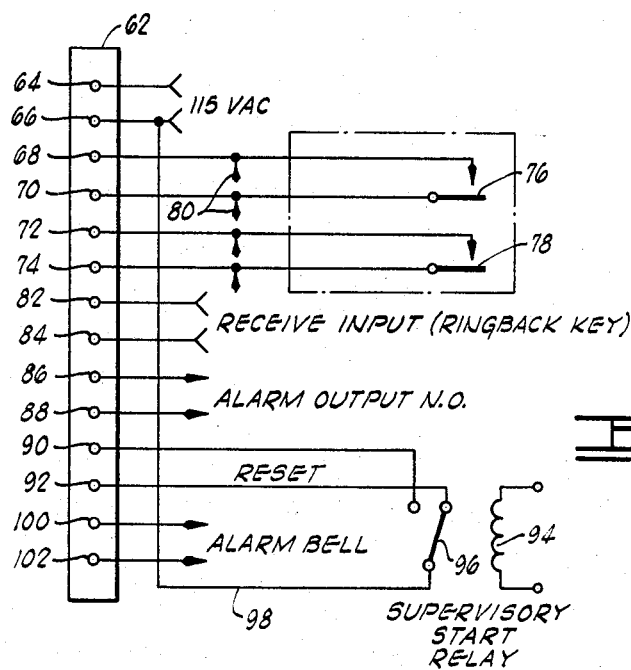
FIG. 3 illustrates interconnection circuitry as utilized at a master terminal.

FIG. 3 illustrates the wiring interconnection for connection to the master terminal relay system tester 24, i.e. test circuit 60, of FIG. 5. Thus, with reference to both FIGS. 3 and 5, a terminal board 62 receives A-C line voltage input at terminals 64 and 66 while terminals 68, 70, 72 and 74 serve as transmitter keying control outputs. Thus, either of the transmitters may normally be transmitting a GUARD frequency signal and can be controlled in response to closure of (protective) relay contacts 76 operating through terminal 68 and 70 to shift the frequency to a TRIP output. Similarly, relay contacts 78 control the second transfer trip transmitter, in this case transmitter 22 of FIG. 1, such that closure of relay contacts 78 will cuase the second transfer trip transmitter to shift from GUARD to TRIP transmission condition. The leads 80 represent the inputs coming from the actual fault detection relays.

Referring again to terminal board 62, the terminals 82 and 84 receive indication of a "receive input," an indication received from the return link 42 (FIG. 1) of the test communications loop. Terminals 86 and 88 carry an alarm output indication to some annunciator or alarm reporting system at the master terminal location. Terminals 90 and 92 allow supervisory alarm reset and starting of the test operation as energization of supervisory start relay 94 shifts relay contact 96 to its other position, dropping out any alarms, and then applies A-C line voltage via jumper lead 98 to terminal 90 which energizes the program motor switch of the master terminal test unit (see FIG. 5), as will be further described below. The terminals 100 and 102 provide connection to an alarm bell at the master terminal position.

Figure 4:
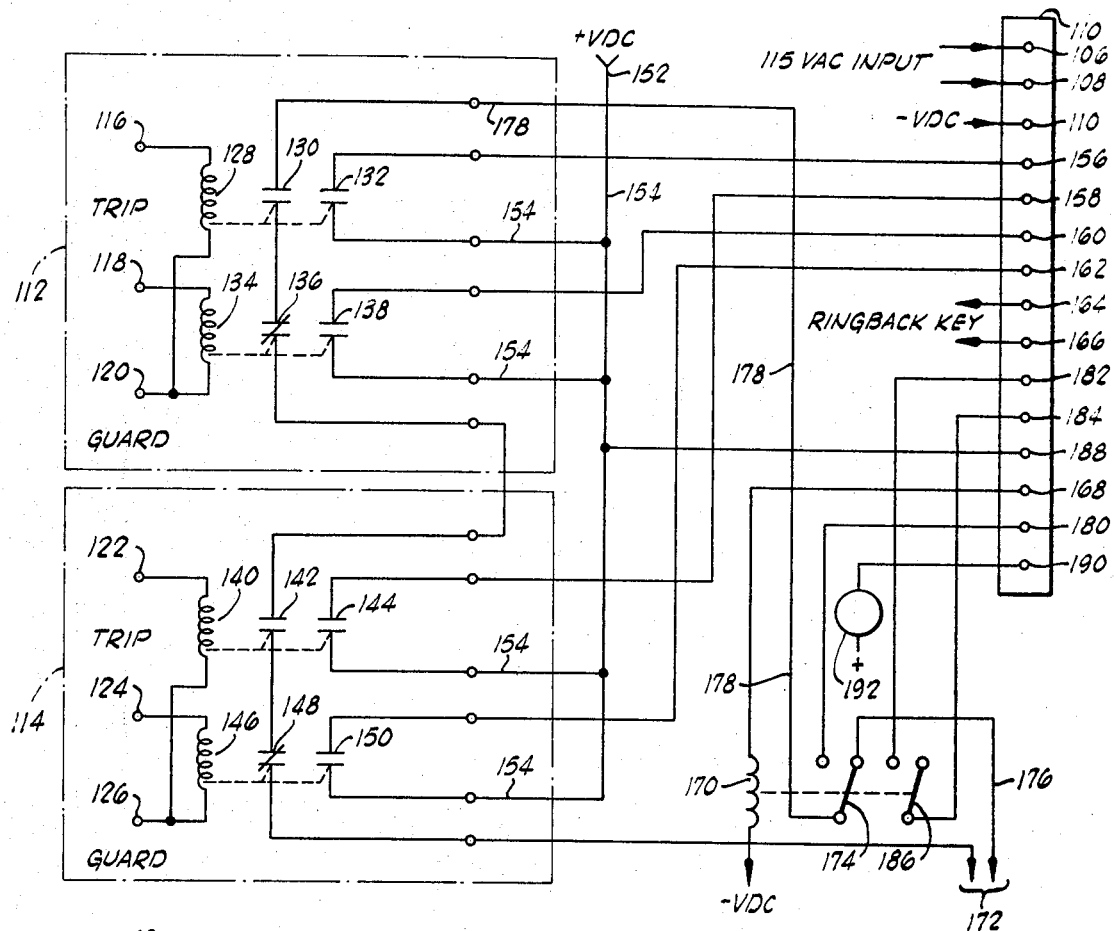
FIG. 4 illustrates interconnection circuitry as utilized as a remote terminal.
Figure 6:
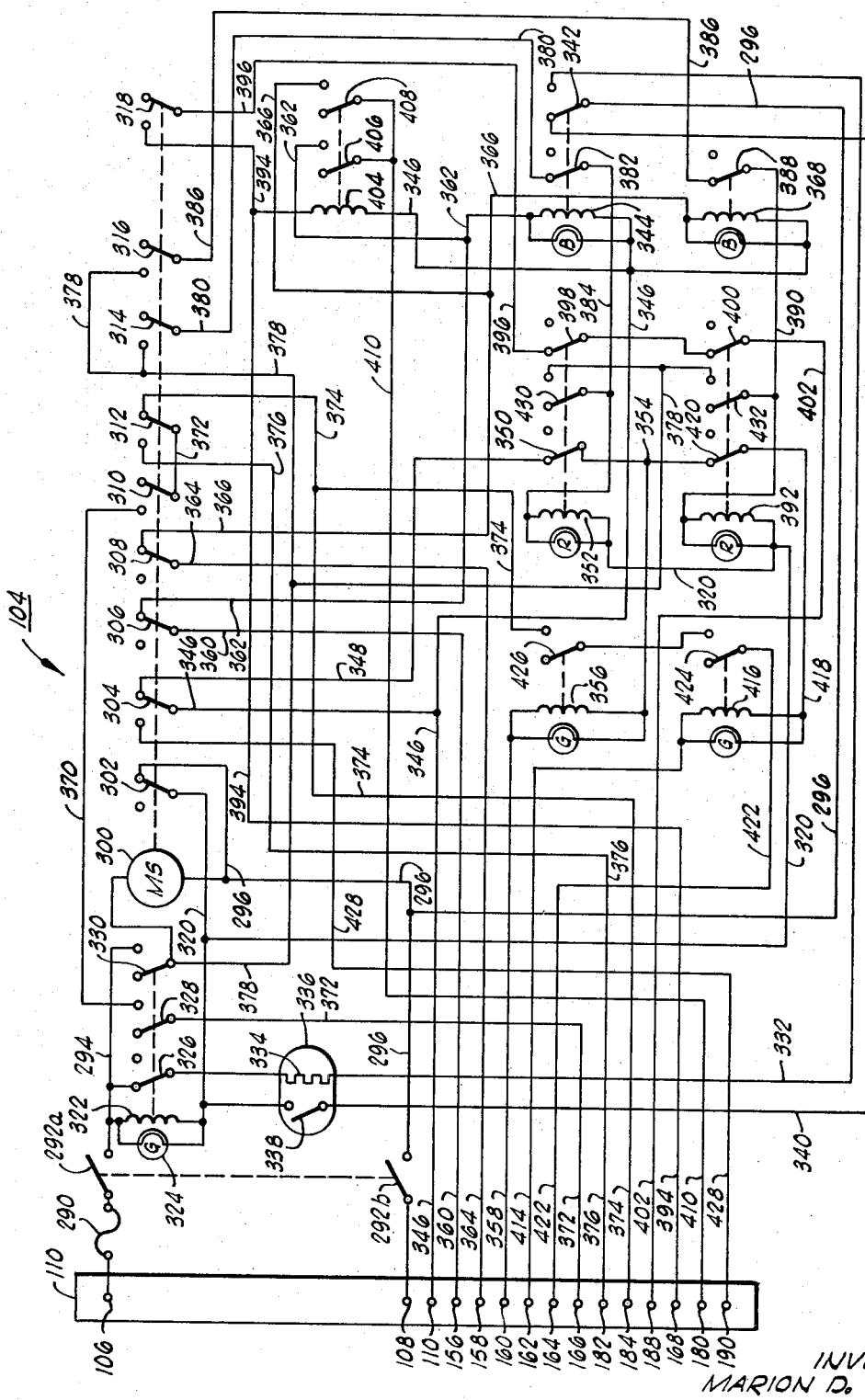
FIG. 6 illustrates in schematic form a system test circuit as utilized at a remote terminal.

Referring now to FIGS. 4 and 6, the interface connections of FIG. 4 provide typical interconnection as between the transfer trip receivers 34 and 36, at the remote terminal position, and the respective relay system tester 32 (FIG. 1), i.e. the schematically illustrated test circuit 104 of FIG. 6. Terminals 106 and 108 of terminal board 110 provide A-C line voltage input to the remote test circuit 104. Negative D-C voltage is applied at terminal 110.

The relay circuit 112 and 114 represent the TRIP and GUARD control output for each of the respective first and second transmitter-receiver systems. Thus, with respect to the first transmitter-receiver system, the TRIP connection 116, GUARD connection 118, and common connection 120 are connected to the output discriminator in the receiver of the transmission link, and one or the other leads will be energized, depending upon whether a TRIP or a GUARD frequency transmission is received. Similarly, the receiver of the second transmitter-receiver channel 3.g. receiver 36 of FIG. 1, has discriminator output connections to energize relay circuitry 114 by means of a TRIP connection 122, GUARD connection 124 and common connection 126 to energize either the TRIP or GUARD relay. In relay circuit 122 a TRIP relay coil 128 controls closure of normally closed contact 136 and a normally open contact 138. The second receiver relay circuit 114 is similarly wired with a TRIP relay coil 140 controlling normally open relay contacts 142 and 144, and a GUARD relay coil 146 controlling normally closed relay contact 148 and normally open contacts 150.

An input positive D-C voltage is applied via input 152 and lead 154 to each of relay contacts 132, 138, 144 and 150. Closure of relay contact 132 provides a TRIP output indication at terminal 156, and a terminal 158 receives signification of a No. 2 channel trip from normally open relay contact 144 in relay circuit 114. In like manner first and second receiver GUARD indications are signified at terminals 160 and 162, respectively. Terminals 164 and 166 provide a ring back key output for control of the return communications link.

A terminal 168 provides output from tester 104 to energize auxilliary relay coil 170 with return to a negative D-C voltage supply. Energization of auxilliary relay 170 disables the breaker tripping coil (not shown) as connected in series with leads 172. Thus, relay contact 174 opens the circuit from tripping coil lead 176 to lead 178 and the normally open trip contact 130. It should be noted that this is the normal tripping circuit and is only open for test purposes. Actuation of relay contact 174 then places terminal 180 in contact with lead 178 and first receiver trip relay contact 130 for test purposes. Also with respect to auxilliary relay coil 170, input from test circuit 104 via terminals 182 and 184 is shorted by relay contacts 186 when relay coil 170 is energized, this for the purpose of enabling ringback keying. The terminal 188 provides connection to the positive D-C voltage lead 154 and the remaining terminal 190 provides connection to an alarm bell 192.

Referring now to FIG. 5, the test circuit 60 receives A-C line input at terminals 64 and 66 for application through a fuse element 200 and ganged ON-OFF switch contacts 202a and 202b to place the A-C line voltage across leads 204 and 206. A clock element 208 is connected across A-C leads 204 and 206 to be continually energized, and the energized clock element 208 closes switch contact 210 periodically, e.g. every 24 hours to energize element 212 of a time delay relay 214. The contacts 216 of relay 214 are normally closed and remain so for a predetermined time delay, e.g. 10 seconds, during which the A-C voltage from lead 206 through contacts 210 is present on a lead 218 to energize each of a green indicator lamp 220, a conventional unit counter element 222 and a program switch drive motor 224. A test switch 225 provides manual start capability.

The program switch drive motor 224 controls the actuation of switch elements 226, 228, 230, 232, 234 and 236 in accordance with a pre-determined program as will be further described below. A suitable form of motorized program switch such as may be constituted by motor 224 and contact elements 226 through 236 is set forth in the afore mentioned U.S. Pat. No. 3,414,773. One form of motorized program switch is known as a "Sealectro-switch" and may be obtained from the Sealectro Corporation of Mamaroneck, New York. Each of the program switch elements 226 through 236 controls functions as follows:

switch contact 226 — test cycle
switch contact 228 — TRIP key No. 1 (normally open)
switch contact 230 — TRIP key No. 2 (normally open)
switch contact 232 — receive ringback link
switch contact 234 — ringback link off
switch contact 236 — open alarm bell Opening and closure of the switch elements 226 through 236 are controlled in accordance with time-cycled programming actuation. It should be noted that switch contacts 226 are maintained open (opposite from that shown) when in the off or between test cycles position and is only closed to the position shown after the program cycle has begun, i.e. after initial energization of motor 224 by clock 208, switch contacts 210 and relay 214.

Thus, switch contacts 226 when closed maintain the A-C energizing voltage from lead 206 onto lead 218 even after time delay release of relay 214. Program switch contacts 228 are normally open but actuated closed by the program to short a lead 238 from terminal 68, a No. 1 trip key lead, through a lead 240 and relay contact 242 for return on lead 244 to terminal 70. Relay contact 242 is controlled by a keying relay 246 which is energized from A-C energized lead 218 through normally closed contacts 248 of time delay relay 250 to A-C lead 204. Energization of relay 250 energizing coil 252, as will be further described, opens contacts 248 on the order of two seconds after initial energization. The program switch contacts 230 operate in the same manner to provide trip No. 2 key output at terminals 72 and 74. That is, leads 254 and 256 are shorted through keying relay contacts 258 and the program switch contacts 230.

Program switch contacts 232 verify the receive ringback link presence by providing connection between A-C lead 204 and relay contact 260 of relay coil 262. The receiver relay coil 262 is connected directly across terminals 82 and 84 by means of leads 264 and 266. The switch contact 234 is connected to the normally open position of relay contacts 260 to provide indication when receiver relay coil 262 is deenergized and the ringback link is off. An alarm relay coil 268 is connected between one side of relay contacts 260 and a lead 270, including normally closed reset push-button switch 272 to terminal 92, an A-C energized lead in the normal position of supervisory start relay 94 (see FIG. 3). The alarm relay coil 268 controls relay contacts 274 which connect holding A-C lead 204 to a supply lead 276 upon closure, and relay coil 268 also controls relay contacts 278 to short leads 280 and 282 as connected to terminals 86 and 88, the alarm output terminals. The connection of the A-C voltage from lead 204 to lead 276 maintains A-C voltage supply to relay coil 252 of relay 250 in certain conditions, as will be further described.

The program switch contacts 236 serve to open leads 284 and 286 as they are connected to terminals 100 and 102, and these series leads interupt alarm bell energization (See FIG. 3). The terminal 90 provides supervisory start energization, through lead 288 which provides A-C energization through time delay relay contact 216 to start the program switch 224 by remotely controlled supervisory equipment.

At the remote station or terminal, the remote test circuit 104 is constituted in much the same manner, hence, A-C energization is applied via input terminals 106 and 108 through a fuse element 290 and ganged ON-OFF switch contacts 292a and 292b to provide the A-C line voltage as between leads 294 and 296.

The test circuit 104 also utilizes a motor-driven program switch similar to that employed in test circuit 60 of FIG. 5. Thus, a motor 300 is energized to actuate each of program switch contacts 302, 304, 306, 308, 310, 312, 314, 316, and 318. The individual functions of the respective program switch contacts 302 through 318 are as follows:

Switch contact 3'—test cycle
Switch contact 304—negative volts D-C cycle and bell
Switch contact 306—open TRIP No. 1 input
Switch contact 308—open TRIP No. 2 input
Switch contact 310—key (ringback)
Switch contact 312—key (trip open)
Switch contact 314—verify TRIP No. 1
Switch contact 316—verify TRIP No. 2
Switch contact 318—open TRIP circuit Program switch contacts 302 provide connection of A-C energizing voltage from supply lead 296 to an intermediate supply lead 320 which provides energization of a relay coil 322 and green indicator lamp 324 connected in parallel therewith. The relay coil 322 controls each of relay contacts 326, 328 and 330. Relay contact 326 provides continuity between A-C lead 294 and a lead 332 to energize relay coil 334 of a time-delay relay 336. The relay contacts 338 are normally open and the time-delay is on the order of 5 seconds, after which the relay contacts 338 close to make continuity between intermediate A-C supply lead 320 and a lead 340 to further relay circuitry. That is, a relay contact 342 is energized by a TRIP relay coil 344 and receiving A-C energizing voltage from supply lead 296 for application through relay contacts 342 to either of leads 340 or 332, as will be further described below.

Program switch contact 304 in its normally closed position provides the connection from terminal 110 and lead 346 through a lead 348 and relay contacts 350 of an alarm relay coil 352 to a lead 354. The lead 354 is then returned through a GUARD relay coil 356 and lead 358 to terminal 160. Program switch 306 provides connection between terminal 156 and lead 360 to a lead 362 which is connected to the TRIP relay coil 344 as returned via lead 346 to the negative D-C voltage terminal 110.

Program switch contact 308 connects terminal 158 and lead 364 to a lead 366 connected to energize a TRIP relay 368 with return to lead 346. The program switch contacts 310 are controlled to provide connection between a jumper lead 170, from relay contact 328, and terminal 166 input lead 372, to provide key ringback actuation through program switch 310, jumper 372 and the normally closed position of program switch contacts 312 with return via lead 374 through GUARD relay contacts 426 and 424 to terminal 164. In the other position of program switch 312, as actuated by the program elements, the connection is made from jumper lead 372 to a lead 376 and terminal 182. The program switch element 314 serves to verify TRIP No. 1 condition by making contact between a lead 378 from relay contact 330 and A-C energizing lead 294 and a lead 380 through normally closed relay contacts 382 of TRIP relay coil 344. Return from relay contacts 382 is via a lead 384 through alarm relay coil 352 and lead 320, the intermediate A-C supply lead. The program switch contact 316 is closed in like manner to test for verification of TRIP No. 2 by connecting the lead 378 to a lead 386 through relay contacts 388 of the No. 2 TRIP relay coil 368 with return via lead 390 through alarm relay coil 392 to the intermediate A-C supply lead 320.

The program switch contacts 318 control connection between an auxiliary relay lead 394 from terminal 168, and a lead 396 through normally closed relay contacts 398 of alarm relay coil 352 and series-connected relay contacts 400 of alarm relay coil 392. Return is via lead 402 to terminal 188, the positive D-C voltage supply. A relay coil 404 is connected between lead 394 and the return lead 346 through terminal 110 to energize relay contacts 406 and 408. Each of contacts 406 and 408 are connected to provide contact from a lead 410 from terminal 180 to respective leads 362 and 366 at respective TRIP relay coils 344 and 368.

Terminal 160 completes the GUARD No. 1 input circuit via lead 358 through GUARD relay coil 356 to leads 354. Similarly, at terminal 162 the GUARD No. 2 input circuit is via lead 414 through GUARD relay coil 416 with return via lead 418 through relay contacts 420 of alarm relay 392 to common lead 354. The terminal 164 is connected via lead 422 through each of the normally open GUARD relay contacts 424 and 426 for connection to lead 374 through the key ringback and key trip open program switch contacts 310 and 312.

The terminal 190 connects via a lead 428 to the normally open position of program switch contact 304. Thus, when program switch contact 304 is actuated, the alarm bell 192 (FIG. 4) can be energized via the negative D-C voltage on lead 346 from terminal 110.

The alarm relay coil 352 also controls holding relay contacts 430 to supply energizing voltage from lead 378. Similarly, the remaining alarm relay coil 392 may be held energized by closing relay contacts 432 connected to lead 378. The respective GUARD, alarm and TRIP relays are indicated by characteristically colored indicator lamps. Thus, the TRIP relay coils 344 and 368 each have a blue indicator lamp connected in parallel therewith, the alarm relay coils 352 and 392 each have a red indicator lamp connected in parallel therewith, and green indicator lamps are connected across each of the GUARD relay coils 356 and 416.

Figure 7:
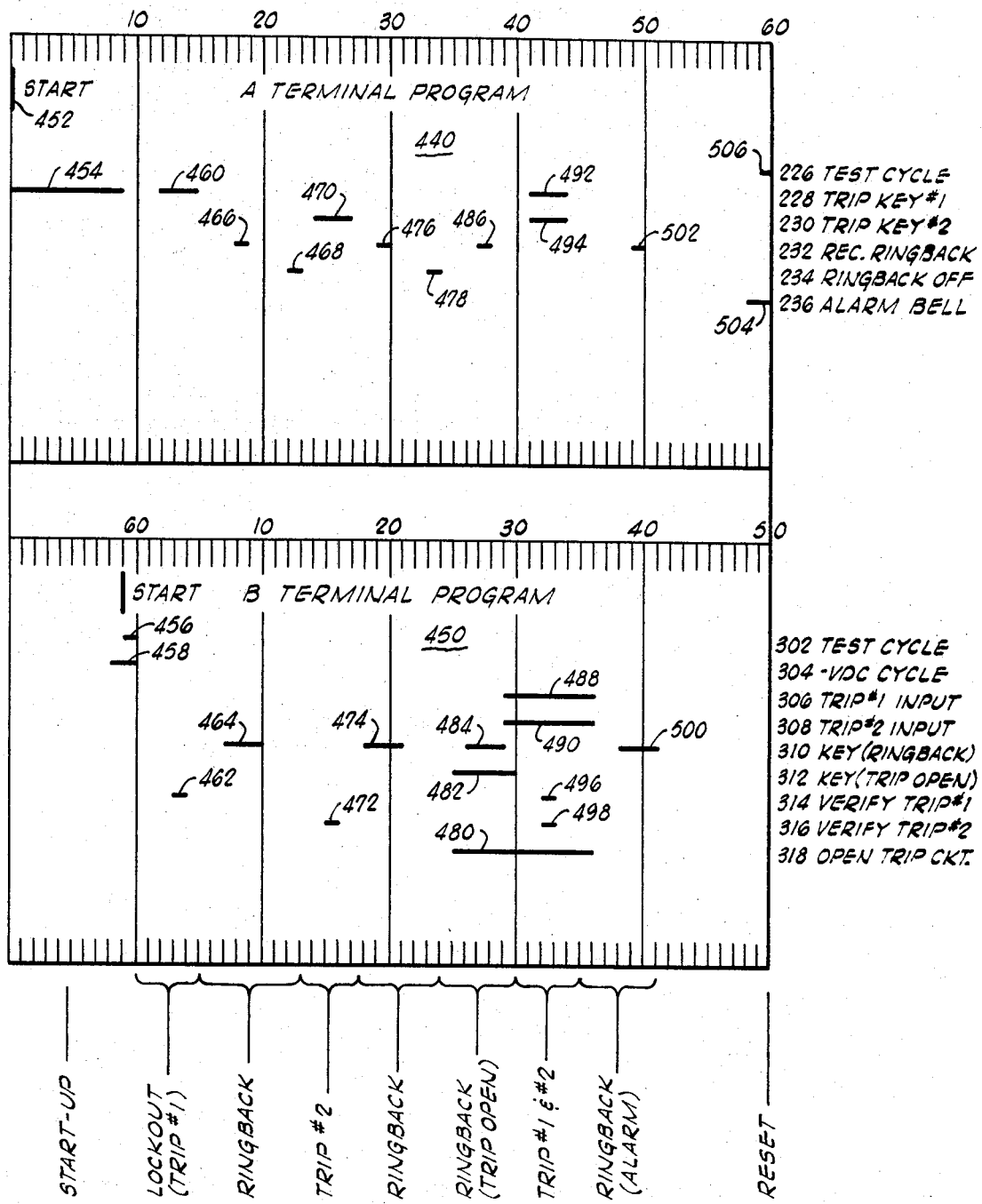
FIG. 7 illustrates in time versus linear position a graphic representation of one form of program as utilized to provide actuation control between a master and a remote terminal.

In operation, the testing system is controlled in accordance with an A terminal program 440 and a B terminal program 450, examples of which are illustrated in FIG. 7. It should be understood that these programs can be varied as to time and sequence; however, there are certain interactive actuations to be observed, and such considerations will be apparent to the skilled operator or artisan. In addition, a system installation wherein there are more than one remote terminals will require a different sequencing. Thus, with primary reference to FIGS. 5, 6 and 7, the operation proceeds as follows:

The synchronous motor driven time clock 208 (FIG. 5) provides an actuation switch 210 to energize the motor 224 of the motor driven program apparatus. That is, program sequencing is begun as motor 224 controls the program control switches 226 through 236. Thus, at start position 452 of terminal program 440 (FIG. 7), the program switch 226 is allowed to be released from an open position to a normally closed position so that energization of motor 224 continues after time delay relay coil 212 releases. The program switch 226 then remains closed for the duration of the test program. Thus, motor 224 may be energized by either the "test" switch 225, the clock-control switch 210, or a supervisory relay contact (not specifically shown). At the same time, the time delay relay element 212, the lock out relay coil 246, and the counter 222 are similarly energized. During the program sector 454, the program switch 228 is actuated to trip key No. 1 enablement, keying its associated transfer trip transmitter to the TRIP condition.

At the remote or B terminal, i.e. test circuit 104, the transfer trip receiver No. 1 switches outputs from GUARD to TRIP. The 5-second normally open B terminal time delay relay 336 will heat through the closed relay contact 342 of channel No. 1 TRIP relay coil 344. When relay coil 344 drops out, the "test on unlocked" lamp 324 lights and relay coil 322 is energized through contact 338 of time delay relay 336 to apply A-C line voltage to the drive motor program switch 300. Motor 300 is then running and is in synchronization with the motor 224 of the A terminal or test circuit 60. Motor 300 will continue running until the end of the 60-second test cycle at which time the "test cycle" program switch 302 will open (Note that it is shown closed), and the opening will remove the ground from relay coil 322 to stop the program switch motor 300.

Again at remote test circuit 104, the program switch 304 is de-actuated at the end of program sector 458 thereby to disable the local alarm bell, and program switch 304 applies negative D-C voltage via lead 348 and relay contacts 350 and 420 to each of GUARD relay coils 356 and 416. The GUARD relay coil 356 and 416 should then be energized with illumination indication of their respective lamps if both GUARD No. 1 and GUARD No. 2 receiver output signals are present.

At the A terminal, test circuit 60, the program sector 460 is effected for 3 seconds to once again energize program switch contacts 228 to key the channel No. 1 to TRIP. At the B terminal, test circuit 104, the channel should switch from GUARD to TRIP, the GUARD relay coil 356 is de-energized and the TRIP relay coil 344 is energized. Thus, during program sector 462 at the B terminal, the program switch contact 314 closes to verify that a TRIP is being received on channel No. 1, if this condition is not met, the channel will alarm and lockout the B terminal test unit 104. Thus, if the TRIP is not received, the channel No. 1 alarm relay coil 352 is energized, and this serves to actuate relay contacts 350 and 430 to remove the ground to both relay coils 356 and 416 as well as the energizing potential for the auxiliary relay coil 170 (terminal 168 of FIG. 4), thereby to prevent ringback to the A terminal, i.e. test circuit 60.

Once again at the B terminal test circuit 104, position eight of B terminal program 450 begins program sector 464 wherein the program switch contact 310 is closed for three seconds to key a tone, carrier or other communication link, i.e. return link 42 of FIG. 1, and this indicates that the B terminal is unlocked and is receiving both channel No. 1 and channel No. 2 GUARD signals. At the A terminal test circuit 60, program sector 466 causes energization of program switch 232, the receive ringback check, to close the contacts thereby to verify reception from the B terminal. If the signal is not received at this time, the alarm relay coil 268 is energized to energize time delay relay coil 252 such that it will heat up and open relay contacts 248 after a two second delay, and the lock out relay coil 246 is de-energized to prevent further testing of either channel. During program sector 468 at the A terminal program 440, the program switch contacts 234 are closed to verify that the ringback link is then in the "off" position.

A next program sector 470 of A terminal program 440 closes the program switch 230 to effect TRIP key No. 2 condition for three seconds, and if the proper ringback was received from the B terminal test unit 104, it will key the channel to TRIP. At the B terminal test circuit 104, if the channel should switch from GUARD to TRIP condition, the GUARD relay coil 416 is de-energized and TRIP relay coil 368 is energized. At program sector 472 of B terminal program 450, the program control switch 316 is closed to verify that a TRIP is being received on channel No. 2 and, if not, the channel will alarm and lock out terminal B. If the TRIP was not received, channel No. 2 alarm relay coil 392 is energized through closed contacts 388 of trip relay coil 368. When the alarm relay coil 392 is energized, its contacts 420, 432, and 400 serve to remove the ground to the GUARD relay coil 416 to latch relay 392, and to disable the open trip circuit to the auxiliary relay coil 170 (FIG. 4) thereby preventing any ringback, opening of the trip circuit or further testing.

Again, at the B terminal position nineteen or program sector 474 the program switch contact 310 is closed for three seconds to key the ringback signal, i.e. if channel No. 2 operated properly and if both channels No. 1 and No. 2 were replaced back in their GUARD condition. At A terminal test circuit 60, program switch contacts 232 are closed, sector 476, to verify ringback reception from the B terminal test circuit 104, and, if there is no such verification, the terminal will alarm and lock out. At program sector 478, the program switch contact 234 closes to verify that the ringback link is presently in the off condition.

At B terminal test circuit 104, program switch contact 318 closes for 11 seconds during program sector 480 to energize the relay coil 404 and auxiliary relay coil 170 (FIG. 4), i.e. if both channel No. 1 and channel No. 2 have operated properly and if no alarms are stored. It should be noted that the purpose of the auxiliary relay is to open the TRIP circuit to the breaker coil and to switch both TRIP conditions into the tester terminal. The purpose of relay coil 404 is to provide an alternate TRIP input when both channels are received together. The program switch contacts 306 and 308 open the individual TRIP input circuits during that portion of the test. The program sector 482 of B terminal program 450 serves to switch the ringback keying circuit through auxiliary relay contact 186. This verifies to the master terminal that the TRIP circuit is open and that testing of both channels together can be performed. Then, program sector 484 effects a three second closure of program switch 310 to key the ringback link if both channels No. 1 and No. 2 GUARD signals are being received, and if the TRIP circuit is open.

At the A terminal test circuit 60, program sector 486 closes program switch 232 to verify reception from the B terminal. At B terminal test circuit 104, the program sectors 488 and 490 actuate the respective switch contacts 306 and 308 for seven seconds thereby to open the individual TRIP inputs to the tester. At A terminal test circuit 60, program sectors 492 and 494 close respective program switches 228 and 230 to key both channels to TRIP. Then, back at B terminal test circuit 104, if both channels were switched from GUARD to TRIP, the TRIP relay coils 344 and 368 should be energized through the then closed contacts 406 and 408 of the alternate relay coil 404 and the auxiliary relay 170 (FIG. 4).

Program sectors 496 and 498 signify actuation of switch contacts 314 and 316 to verify that both TRIP signals are then being received. After contact 318 opens, releasing the TRIP circuit, the program sector 500 closes the ringback key switch contacts 310 for three seconds if both channels are back in the GUARD condition and if no alarms are stored. At A terminal test circuit 60, program sector 502 closes contacts 232 to verify ringback reception from the B terminal and the successful completion of the test sequence. Thereafter, the A terminal program sector 504 closes switch contacts 236 to enable the alarm bell circuit. And, finally, program sector 506 opens the normally closed switch contacts 226 to de-energize the program switch drive motor 224 and to place the test equipment once again in the standby or end of test cycle condition.

The foregoing discloses new and useful test equipment for checking particular forms of transmission line circuit protective relaying systems, particularly those systems known as remote, dual transfer trip relaying systems of the unidirectional variety. Thus, the present invention discloses installations for both the master and remote terminals with provision for ringback and verification of various test situations by whatever available return communications links. It is further contemplated that the basic and essential components of the present system may be readily combined with other forms of carrier, microwave, pilot wire, and other communications systems to effect far-ranging and widely specialized procedures.

Changes may be made in the combination and arrangement of elements as heretofore set forth in the specification and shown in the drawing; it being understood that changes may be made in the embodiments disclosed without departing from the spirit and scope of the invention as defined in the following claims.

What is claimed is:

1. A method for automatic testing of surveillance equipment operating between spaced terminals, said surveillance equipment consisting of a uni-directional, dual-channel transfer trip transmitter and receiver interconnection, and some form of return communications link, said transfer trip transmitter normally transmitting a first frequency GUARD signal and being controllable to transmit a second frequency TRIP signal indicative of a pre-set condition, said method comprising steps of:

receiving test sequence energization and thereafter generating a series of test actuation outputs at a first terminal;

effecting energization in response to a selected one of said test actuation outputs to control a selected one of said first and second transfer trip transmitters to transmit said trip frequency signal from said first terminal; and receiving said trip frequency signal from a respective one of said first and second transfer trip receivers at a second terminal to cause characteristic energization of said return communication link thereby to indicate at said first terminal the reception of said trip frequency signal by said transfer trip receiver at the second terminal.

2. Apparatus for automatic testing of surveillance equipment operating between spaced terminals, said surveillance equipment consisting of a uni-directional, dual-channel transfer trip transmitter and receiver interconnection, and some from of return communications link, said transfer trip transmitter normally transmitting a first frequency guard signal and being controllable to transmit a second frequency trip signal indicative of a pre-set condition, said apparatus comprising:

motor means energizable to provide a constant rotational output;

program drum means receiving rotational output from said motor means;

plural program actuation means disposed as a plurality of circumferential rows about said program drum means; and plural switch means positioned adjacent each of said plural rows of program actuation means to be actuated thereby in accordance with pre-set program sequence;

second means connected to be energized by a selected one of said test actuation outputs to control a selected one of said first and second transfer trip transmitters to transmit said trip signal; and third means responsive to said respective one of said first and second transfer trip receivers upon receiving said second frequency trip signal to cause characteristic energization of said return communication link to indicate at said first means the reception of said trip frequency signal by said transfer trip receiver at the second terminal.

3. Apparatus as set forth in claim 2 wherein said first means comprises:

program switch means which is periodically energized to effect a plurality of said test initiation actuations in a pre-set sequence.

4. Apparatus as set forth in claim 2 wherein said third means includes:

remote program switch means energized to generate a series of second test actuations in synchronism with said first means test actuations.

5. Apparatus for automatic testing of transmission line protective relay systems of the scheme which includes uni-directional, dual-channel remote transfer trip transmission circuitry having transfer trip transmitters at a first position and transfer trip receivers at a second position with a return communications link connected between said first and second position, the apparatus comprising:

program switch means located at said first position which is periodically energized to effect a plurality of said test initiation actuations in a pre-set sequence after an initial energization;

second program means located at said second position and providing a series of second test actuations after initial energization;

guard relay means located at said second position and being enabled upon receipt of guard signal transmission from said first position to provide a guard output during a selected one of said second test actuations;

circuit means located at said second location for receiving said guard output to cause respective ring back indication for transmission by said return communications links;

second relay means located at said first position, said second relay means being energized to enable first and second trip key output; and, first and second actuation means each conducting respective first and second trip key outputs when actuated closed by said first program means to generate said first and second trip outputs from respective first and second transfer trip transmitters.

6. Apparatus as set forth in claim 5 wherein said program switch means comprises:

motor means energizable to provide a constant rotationable output;

plural program actuation means disposed of a plurality of circumferential rows about said program drum means; and plural switch means positioned adjacent each of said plural rows of program actuation means to be actuated thereby in accordance with pre-set program sequence.

7. Apparatus as set forth in claim 5 wherein said second program means includes:

remote program switch means energized to generate a series of second test actuations in synchronism with said first means test actuations.

8. Apparatus as set forth in claim 7 wherein said remote program switch means comprises:

motor means energizable to provide a constant rotationable output;

plural program actuation means disposed of a plurality of circumferential rows about said program drums means; and plural switch means positioned adjacent each of said plural rows of program actuation means to be actuated thereby in accordance with pre-set program sequence.

9. Apparatus as set forth in claim 6 which is further characterized to include:

auxiliary relay means disposed at said second position to be energized for a pre-set time by a selected one of said test actuations, thereby to disable trip circuitry.

10. Apparatus as set forth in claim 5 which is further characterized to include:

alarm circuit means at said first position;

receive relay means at said first position which is energized in response to ringback indication on said return communications link thereby to disable said alarm circuit means.

11. Apparatus as set forth in claim 10 wherein said alarm circuit means includes:

alarm actuation means periodically actuated by said first program means and connected in series with said receive relay means to enable said alarm circuit means when actuated.

* * * * *